United States Patent [19]

Blanchard et al.

[11] 3,998,733
[45] Dec. 21, 1976

[54] DETERGENT COMPOSITION FOR DISPERSING OIL SPILLS

[75] Inventors: Peter Michael Blanchard, West Molesey; Dudley Grahame Meeks, Kingston-upon-Thames, both of England

[73] Assignee: The British Petroleum Company Limited, London, England

[22] Filed: Nov. 13, 1974

[21] Appl. No.: 523,525

[30] Foreign Application Priority Data

Nov. 21, 1973 United Kingdom ............ 53923/73

[52] U.S. Cl. .......................... 210/59; 210/DIG. 25; 252/312; 252/354; 252/550; 252/551; 252/554; 252/559; 252/170

[51] Int. Cl.² ..................... B01F 3/08; B01F 17/02; C11D 1/83

[58] Field of Search ............... 210/42, 59, DIG. 21; 252/354, 312, 550, 551, 554, 559, 170

[56] References Cited
UNITED STATES PATENTS

| | | | |
|---|---|---|---|
| 3,031,409 | 4/1962 | Perlman et al. | 252/158 |
| 3,198,731 | 8/1965 | De Lew | 210/42 |
| 3,272,758 | 9/1966 | De Lew et al. | 252/354 |
| 3,360,476 | 12/1967 | Krusius | 252/107 |
| 3,484,370 | 12/1969 | Simon | 210/23 |
| 3,577,340 | 5/1971 | Paviak et al. | 210/42 |
| 3,625,857 | 12/1971 | Weimer et al. | 252/312 |
| 3,639,255 | 2/1972 | Boardman et al. | 252/312 |
| 3,681,264 | 8/1972 | Prial | 252/526 |
| 3,686,099 | 8/1972 | Andreevna et al. | 252/554 |
| 3,793,218 | 2/1974 | Canevari | 252/312 |
| 3,810,835 | 5/1974 | Ferm | 210/59 |
| 3,839,234 | 10/1974 | Roscoe | 252/544 |
| 3,882,038 | 5/1975 | Clayton et al. | 252/164 |

OTHER PUBLICATIONS

"Cellosolve and Carbitol Solvents", Union Carbide, N.Y., 1962, pp. 1-9 and 41.

Primary Examiner—P.E. Willis, Jr.
Attorney, Agent, or Firm—Morgan, Finnegan, Pine, Foley & Lee

[57] ABSTRACT

A detergent composition for dealing with oil spills on water comprises an ester of a polyoxyethylene glycol ester of a C10-24 fatty acid, an organic sulphate or sulphonate detergent, an alcohol or glycol of molecular weight 90–250.

11 Claims, 1 Drawing Figure

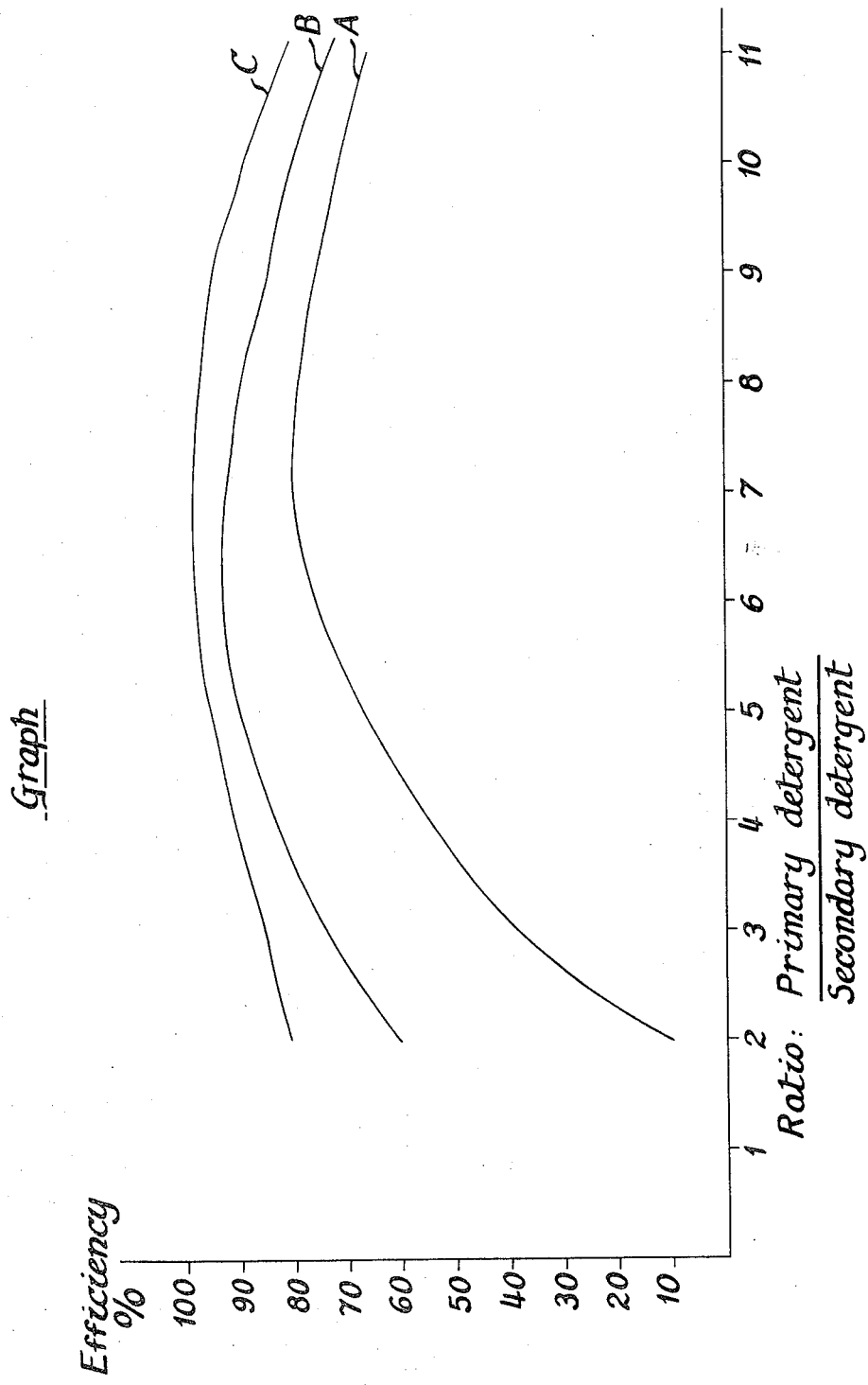
*Graph*

DETERGENT COMPOSITION FOR DISPERSING OIL SPILLS

This invention relates to dispersant compositions which can be used to disperse crude petroleum or petroleum fractions spilt on water, and to a method of dispersing such spilt material.

When crude petroleum or fractions obtained by the refining of crude petroleum, hereinafter referred to as oil, are transported over water by tank ships, there is a possibility that spillages can occur. One way of dealing with such spillages of oil is to spray a detergent composition onto the oil, and to agitate the spilt oil and water as to form an emulsion of the oil and water. The emulsion formed is diluted in the water, and consequently the spilt material is dispersed as very fine droplets thus reducing its effect on the marine environment and assisting its biodegradation.

Dispersant compositions which have been used and disclosed in our UK patent application 03465/71 and 27942/71 consist of a detergent, a solvent and a coupling agent. The detergents which have commonly been used are esters of oleic acid and polyoxyethylene glycol. This detergent is dissolved in a hydrocarbon solvent, such as dearomatised kerosine, which causes the detergent to mix more easily with the spilt oil; the coupling agent, for example isopropyl alcohol or hexylene glycol is added to promote good miscibility between the detergent and the solvent. These dispersant compositions usually comprise 15–90% of solvent.

When a dispersant composition is sprayed on spillages at sea, it is desirable that the vessels spraying should spend as little time as possible refilling with dispersant composition. As the active agent in the detergent composition is detergent, it is clear that the storage capacity on the spraying vessel occupied by the solvent can be considered wasted for functional purposes. Also spraying with a composition containing a hydrocarbon solvent means that more hydrocarbon is added to the already polluted sea. Furthermore storage of compositions containing relatively large proportions of hydrocarbons such as kerosine, can increase the hazard of fire. It has been found however that spraying with a neat detergent composition causes inadequate mixing of the detergent composition with the oil.

We have now devised a dispersant composition which can be dispersed in sea water at the time of spraying, the water acting as carrier. (The dispersant composition can also be diluted with dearomatised kerosine). When the dispersant composition is to be diluted with sea water a dispersant composition of the invention can be sprayed from a vessel, with none of the vessels carrying capacity being occupied by a hydrocarbon solvent, and consequently less frequent refilling of the vessel with dispersant composition is required.

When the composition is to be used to clear for example, beaches it can be used dissolved in a suitably refined kerosine. Thus the composition can have a dual role i.e. dispersed in sea water for cleaning spills at sea, and dissolved in kerosine for cleaning beaches, and this dual capability rationalises stock holding for bodies who have to deal with both types of pollution.

According to the invention there is provided an oil and water miscible composition which comprises an ester of a polyoxyethylene glycol and a $C_{10}$–$C_{24}$ fatty acid, an organic sulphate or sulphonate detergent and a glycol or alcohol of molecular weight 90–250.

The invention also provides a method of dispersing oil spilt on water, which method comprises applying the composition of the invention in a carrier fluid to the oil and agitating the mixture formed to disperse the oil.

The term "water miscible composition" refers to fresh water i.e. the composition is miscible in fresh water. In sea water, which can vary in its nature from place to place, the compositions of the invention are at least dispersible, to concentrate active component at the oil water interface.

The fatty acid may be saturated or unsaturated, for example lauric, myristic, palmitic, stearic and oleic acids, Esters of mixtures of fatty acids can be used e.g. esterified tall oil acids.

The esters of polyoxyethylene glycols and the fatty acid can be formed by condensing a polyoxyethylene glycol with a fatty acid or by condensing a fatty acid with ethylene oxide.

The mono- or diesters of polyoxyethylene glycols can be used, though preferably the monoesters are used. The preferred monoesters have the formula:

$$R-\overset{\overset{O}{\|}}{C}O(C_2H_4O)_x H \qquad (1)$$

where R is a $C_9$–$C_{23}$ alkyl or alkenyl group and x is on average from 2 to 7, more preferably from 3 to 5.

The esters are preferably water insoluble.

Preferred esters are esters of oleic acid and a polyoxyethylene glycol containing an average of from 3 to 5 ($C_2H_4O$) groups, i.e. x in the above formula (I) is 3 to 5, and R is a $CH_3(CH_2)_7CH=CH(CH_2)_7$ group.

Preferably mixtures of esters of different ethylene oxide content are used with an average ethylene oxide content with the ranges given.

Preferred organic sulphate or sulphonate detergents are for example alkyl sulphates and sulphonates, alkyl ether sulphates and sulphonates, alkyl aromatic sulphonates and salts of alkyl, alkyl ether and alkyl aromatic sulphates and sulphonates. Examples of suitable salts are the alkali metal salts, e.g. the sodium salt, the ammonium salts, amino salts and amino alcohol salts.

The molecular weight of the organic sulphate or sulphonate detergents is preferably from 200 to 500, more preferably from 300 to 475.

The molecular weight of the organic sulphate or sulphonate detergent refers to the molecular weight of the acid moiety i.e. not counting the molecular weight of sodium, triethanolamine or other cationic moiety.

When an alkyl ether sulphate is the sulphur containing detergent, the alkyl group may be saturated or unsaturated and preferably has from 10 to 18 carbon atoms, more preferably $C_{13}$–$C_{15}$ and the ether moiety preferably contains from 2 to 9 moles of ethylene oxide, more preferably 3 moles.

The preferred alcohols and glycols of molecular weight 90 to 250 are from example alkylene oxide condensates of alkanols e.g. condensates of ethylene oxide and/or propylene oxide with butyl alcohol. Particular alcohols and glycols which can be used are sold under the Registered Trade Marks "Cellosolve", "Carbitol" and "Teefroth".

The preferred proportions of the ingredients of the composition are 25 to 50% wt. of the fatty acid condensates, 5 to 45% of the organic sulphate or sulphonate detergent and 5 to 65% of the alcohol or glycol of molecular weight 90 to 250.

Preferably the closed cup flash point of the composition is at least 145° F.

A small amount e.g. 0.1 to 5% wt of the total composition, of a low molecular weight alcohol can optionally be added to the composition in order to increase the rate of dispersion in the spilt oil. Examples of suitable low molecular weight alcohols are isopropyl alcohol, sec-butyl alcohol and hexylene glycol.

In use on the open sea, water can be added to the dispersant composition just before it is applied to the spilt oil e.g. by having a nozzle with two entries, one for sea-water and one for the dispersant composition. Preferably the dispersant composition of the invention is mixed with from 2 to 10 volumes of water before being applied to the spilt oil.

The dispersant composition of the invention dispersed in seawater, can be applied to the spilt oil by any conventional method. A usual method for applying dispersant compositions is simply by spraying the diluted composition onto the surface of the spilt oil. The agitation of the mixture formed by application of the dispersant can take place as a consequence of hosing or spraying the dispersant composition into the spilt oil, and at sea by natural wave motion. Alternatively ships can be driven through the mixture, and the disturbance caused by their passage and the action of their propellers providing agitation. In some cases a surface agitator can be towed through the spilt oil/dispersant mixture.

The amount of dispersant composition added to the spilt oil is usually from 5 to 100% by volume of the spilt oil, preferably from 20 to 50% by volume based on the amount of dispersant composition depending on the viscosity of the spilt oil.

When oil is spilt on beaches or washed up on beaches or other land areas, the dispersant composition can be diluted with a hydrocarbon solvent such as a de-aromatised kerosine e.g. kerosine with an aromatic content of below 3% weight. The amount of hydrocarbon solvent is preferably 50 to 90% weight of the composition.

The invention will now be described in the following Examples.

Example 1

Dispersant compositions were prepared and their compositions are given below:

1. 32.5% volume of $CH_3(CH_2)_7CH = CH(CH_2)_7 C.O.(C_2H_4O)_{4.5}H$. hereinafter called the primary detergent. In such esters the value 4.5 for the number of ethylene oxide groups is a calculated average value of a number of esters containing different numbers of ethylene oxide groups, such esters are hereinafter referred to as the primary surfactant. 35.0% volume of the sodium salt of an ethoxylated alkyl sulphate of molecular weight of approximately 440. 32.5% volume of a condensate of butyl alcohol and ethylene oxide sold under the Trade Name "Butyl Cellosolve" of molecular weight 118.

2. 42% volume of the primary detergent 15% volume of the triethanolamine salt of an alkyl benzene sulphonic acid MW approximately 312. 43% volume of condensate of butyl alcohol and ethylene oxide, sold under the Trade Name "Butyl Cellosolve" of molecular weight 118.

3. 42% volume primary detergent 15% volume of the triethanolamine salt of an alkyl benzene sulphonic acid of MW approximately 312 43% volume of a condensate of an alcohol and propylene oxide sold under the Trade Mark "Teeforth" of molecular weight within the range 90 to 250.

For comparative purposes further compositions were formulated which are outside the scope of the invention, and these compositions are listed below:

4. 74% volume primary surfactant 26% volume of the triethanolamine salt of an alkyl benzene sulphonate MW 312

5. 42% volume of primary surfactant 58% volume of condensate of an alcohol and propylene oxide sold under the Trade Name "Teeforth" of MW 90 to 250.

The compositions were tested for their dispersant effects in a tank dispersant test and sea trials.

TESTING PROCEDURE

1. Tank Dispersion Test

A rectangular transparent tank (28 cm × 56 cm × 30 cm deep) was filled with 30 liters of salt water. A slick of 1 ml of 1500 sec fuel oil was placed on the clean water surface within a freely floating ring of 15 cm diameter and treated with 1 ml of the dispersant under test. After allowing a soaking period of about 1 minute an agitator comprising an 8 cm by 27 cm plate, 13½cm immersed in the water was started. The agitator was pivoted at one end and spring-loaded against an eccentric cam positioned to give an oscillation amplitude of 1 cm at the water surface with a frequency of approximately 150 cycles/minute. Visual observation of the type and degree of dispersion were made after 5 minutes agitation.

2. Sea Trial

A Middle East crude petroleum was sprayed from a moving boat and then the dispersant composition was sprayed onto the oil. A surface agitator comprising three linked wooden-gate structures each formed from a rectangular wooden frame with five cross pieces was towed through the oil/dispersant mixture.

The effect was observed from a following boat.

The results are shown below in Table 1.

Table 1

| Composition | Sea Trial Maximum rate of discharge of crude petroleum which is dispersed by the composition+ gallons/minutes | Tank Test Efficiency (percentage of oil dispersed after 5 minutes) |
| --- | --- | --- |
| 1 as a 10% dispersion in sea water | 2.0–2.5 | 60–80* |
| 2 as a 10% dispersion in sea water | 2 | 60* |
| 2 at 25% vol in dearomatised kerosine | 5 | 90 |
| 3 at 25% vol in dearomatised kerosine | — | 90 |
| 4 at 25% vol in dearomatised kerosine | — | 50 |
| 5 at 25% vol in dearomatised kerosine | — | 70 |

*Composition premixed as a 25% dispersion in sea water.
+Composition is discharged at a constant rate of approx 3.7 gallons/minute.

The use of the primary detergent on its own was unsuccessful owing to lack of adequate miscibility with the water; the use of the sulphonate detergent on its own was unsuccessful owing to lack of adequate miscibility with the oil, and the use of "Teeforth" on its own was unsuccessful owing to lack of miscibility with the oil in the presence of the water.

COMPARATIVE TRIAL

A commercially available composition was tested in the same way as in the Example, and the result shown below in Table 2.

Table 2

| Composition | Sea Trial (As in Table 1) | Tank Test (As in Table 1) |
| --- | --- | --- |
| Similar commercially available composition as a 10% dispersion in sea water | 2.0 | 60* |

EXAMPLE 2

Various ratios of the esters of polyoxyethylene glycol and a fatty acid called the primary dispersant to organic sulphate or sulphonate detergent, called the secondary detergent were tested, in the Tank Test. The efficiency was plotted against the ratio of primary detergent to secondary detergent with the results shown in graph 1. The ratio was expressed as a weight ratio of active ingredients. In the graph line A refers to the neat mixture, line B refers to a 25% dispersion in sea-water and line C refers to a 25% solution in kerosine.

We claim:

1. An oil and water miscible composition suitable for dispersing oil spilt on water or beaches consisting essentially of
   i. from 25 to 50% wt of an ester of a polyoxyethylene glycol and a $C_{10}$–$C_{24}$ fatty acid, the ester having the general formula:

$$R-\overset{O}{\underset{\|}{C}}O(C_2H_4O)_xH$$

where R is selected from the group consisting of $C_9$–$C_{23}$ alkyl and $C_9$–$C_{23}$ groups alkenyl groups and x is from 2 to 7,
   ii. from 5 to 45% wt of a detergent selected from the group consisting of organic sulphate detergents and organic sulphonate detergents having a molecular weight of from 200 to 500 and selected from the group consisting of an alkyl sulphate, an alkyl sulphonate, alkyl ether sulphate, alkyl ether sulphonate, alkyl aromatic sulphate, alkyl aromatic sulphonate and a salt of any one thereof, and
   iii. from 5 to 65% wt of an alkylene oxide condensate of an alkanol having molecular weight of 90 to 250.

2. A composition as claimed in claim 1 in which x is from 3 to 5.

3. A composition as claimed in claim 1 in which the detergent is selected from the group consisting of sodium, ammonium, amino and amino alcohol salts of organic sulphates and organic sulphonates.

4. A composition as claimed in claim 1 in which the molecular weight of the detergent is from 300 to 475.

5. A composition as claimed in claim 1 wherein, in the alkylene oxide condensate of an alkanol, the alkylene oxide is selected from the group consisting of ethylene oxide, propylene oxide and mixtures thereof.

6. A composition as claimed in claim 1 wherein, in the alkylene oxide condensate of an alkanol, the alkanol is a butyl alcohol.

7. A composition as claimed in claim 1 which has a closed cup flash point of at least 145° F.

8. A composition as claimed in claim 1 which also contains from 1 to 5% wt of an alcohol selected from the group consisting of isopropyl alcohol, sec-butyl alcohol and hexylene glycol.

9. A method of dispersing oil spilt on the surface of water which comprises contacting the spilt oil with from 5 to 100% by volume of the spilt oil of a composition as claimed in claim 1 and agitating the mixture formed to disperse the oil.

10. A method as claimed in claim 9 wherein the volume of composition is from 20 to 50% by volume of the spilt oil.

11. A method of dispersing oil on beaches or other land areas comprising treating the oil with a composition as claimed in claim 1 diluted with from 50 to 90% wt of a kerosine having an aromatic content of below 3% wt.

* * * * *